United States Patent
La et al.

(10) Patent No.: US 7,437,059 B1
(45) Date of Patent: Oct. 14, 2008

(54) METHODS AND SYSTEMS FOR EXPANDING RECORDING CAPACITY OF OPTICAL DISCS

(75) Inventors: Luke Kien La, Santa Clara, CA (US); Kenneth James, Pleasanton, CA (US)

(73) Assignee: Sonic Solutions, Santa Clara, CA (US)

( * ) Notice: Subject to any disclaimer, the term of this patent is extended or adjusted under 35 U.S.C. 154(b) by 1073 days.

(21) Appl. No.: 10/301,100

(22) Filed: Nov. 20, 2002

(51) Int. Cl.
*H04N 5/00* (2006.01)
(52) U.S. Cl. .................. 386/126; 386/83; 386/109
(58) Field of Classification Search ............ 386/126, 386/109, 83, 209; 369/13.56
See application file for complete search history.

(56) References Cited

U.S. PATENT DOCUMENTS 6,967,912 B1 * 11/2005 Roh .................... 369/47.38

* cited by examiner

*Primary Examiner*—Thai Tran
*Assistant Examiner*—Girumsew Wendmagegn
(74) *Attorney, Agent, or Firm*—Martine Penilla & Gencarella, LLP

(57) ABSTRACT

A software driven method for appending data to a rewritable optical disc is provided. The method includes detecting a rewritable optical disc, and the rewritable optical disc contains a first written session with a file system and an associated volume descriptor. The method then detects a request to write a new session to the rewritable optical disc. Now, it is determined that the new session is to be written past a boundary limit, e.g., such as an OS boundary. A new file system for the new session is then generated, where the new file system having an updated volume descriptor. Data for the new session is written and the volume descriptor of the first written session is replaced with the updated volume descriptor.

18 Claims, 4 Drawing Sheets

METHODS AND SYSTEMS FOR EXPANDING RECORDING CAPACITY OF OPTICAL DISCS

CROSS REFERENCE TO RELATED APPLICATION

This application is related to U.S. patent application Ser. No. 10/185,305, filed on Jun. 26, 2002, and entitled "Methods for Recording Multiple Sessions on a Rewritable DVD Disc." The disclosure of this application, which is assigned to the assignee of the subject application, is incorporated herein by reference.

BACKGROUND OF THE INVENTION

1. Field of the Invention

The present invention relates generally to the recording and reading of data to optical media, and more specifically to methods and systems for recording and reading data to optical media past some software boundary limit.

2. Description of the Related Art

Currently, rewritable DVD discs provide the user with storage capacities of up to 4.3 Gigabytes or more on a single side. This would potentially allow users to store much more data than on conventional CD-ROMs. However, certain limitations on the current reading capability of the rewritable DVD disc does not allow the user to realize this full potential.

As is well known, there are several types of optical media standards to define structure and format on optical media to ensure compatibility across disparate operating systems, components, and devices. One standard that covers rewritable DVD discs is UDF (Universal Disc Format). Working with the UDF operating system however has limitations.

During the operation of reading data from the rewritable DVD disc, the following steps occur. When the DVD is first read the anchor is located. The anchor points to the volume descriptors of the first associated data files. Volume descriptors are in a file system associated with subject data files. Each file system borders its associated data file. Within the file system the volume descriptors point to the file identifiers, which are contained in the file system. The file identifiers point to the associated data files, which have been stored on the disc, with appropriate modifications to an anchor of the first written session, it is possible to write and access more than one session.

A problem occurs once a physical boundary of 4 Gigabytes is crossed. That is to say, some operating systems (e.g., Microsoft Windows™) cannot read a volume descriptor past the 4 Gigabyte physical boundary on the disc. Thus, user data referenced by any volume descriptor written after this point is invisible to the operating system, and thus, data written past this boundary cannot be read. More specifically, volume descriptors written after the 4 Gigabye physical boundary cannot be mounted by the operating system.

For example, the user could be near the 4 Gigabyte physical boundary and then try to write volume descriptors and associated data files after this point. When the operating system attempts to read the post 4 Gigabyte volume descriptors the attempt would fail and the associated data would be lost due to the limitations discussed above. This would leave the remaining space after 4 Gigabytes as wasted space. As can be appreciated, this drawback defeats one of the main purposes of the innovation of DVD technology, which is increased storage capacity.

In view of the foregoing, what is needed is a method and system for enabling the recording of data files on a rewritable DVD disc without the limitations imposed by the 4 Gigabyte physical boundary.

SUMMARY OF THE INVENTION

Broadly speaking, the present invention fills these needs by providing a method, apparatus, and computer program for reading and recording data past some software boundary limit of an optical media. The present invention can be implemented in numerous ways, including as a process, an apparatus, a system, a device, a method, or computer readable media. Several embodiments of the present invention are described below.

In one embodiment, a software driven method for appending data to a rewritable DVD disc is disclosed. The method includes detecting a rewritable DVD disc, and the rewritable DVD disc contains a first written session with a file system and an associated volume descriptor. The method then detects a request to write a new session to the rewritable DVD disc. Now, it is determined that the new session is to be written past an Operating System boundary limit. A new file system for the new session is then generated, where the new file system has an updated volume descriptor. Data for the new session is written and the volume descriptor of the first written session is replaced with the updated volume descriptor.

In another embodiment, a software driven method for appending data to a rewritable DVD disc is provided. A rewritable DVD disc for recording, wherein the rewritable DVD disc contains a previously written session with a file system and an associated volume descriptor, is received. A request to append a new session to the rewritable DVD disc is then detected. A file system for the new session, the file system having an updated volume descriptor, is generated. Data for the new session is then written. The volume descriptor of a first written session is replaced with an updated volume descriptor of the new session.

In another embodiment, a computer driven method for recording data to an optical disc is provided. An optical disc, wherein the optical disc contains a first written session with a file system and an associated volume descriptor, is detected. A request to write a new session to the optical disc is detected. Then it is determined that the new session is to be written past an Operating System volume reading limit. A new file system for the new session, the new file system having an updated volume descriptor, is generated. Data for the new session is then written. The volume descriptor of the first written session is replaced with the updated volume descriptor.

In another embodiment, computer readable media having program instructions for appending data to an optical disc is disclosed. An optical disc, wherein the optical disc contains a first written session with a file system and an associated volume descriptor, is detected. A request to write a new session to the optical disc is detected. Then, it is determined that the new session is to be written past a boundary limit. A new file system for the new session, the new file system having an updated volume descriptor, is generated. Data for the new session is then written. The volume descriptor of the first written session is replaced with the updated volume descriptor.

In another embodiment, a software driven method for recording data to an optical media is disclosed. An optical media, wherein the optical media contains a first written session with a file system and an associated volume descriptor, is detected. A request to write a new session to the optical media is detected. Then, it is determined that the new session is to be written past a software boundary limit. A new file system for the new session, the new file system having an updated volume descriptor, is generated. Data for the new session to the optical media is written. The volume descriptor of the first written session is replaced with the updated volume descriptor.

The advantages of the present invention are numerous. One notable benefit and advantage of the invention is that the user can save data past the Operating System (OS) Boundary limit or other limit set by software, and then later access that data. This, of course, will enable the use of the entire rewritable DVD disc storage space. Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for recording and reading data past some software boundary limit of an optical media. The optical media can be any optical media form, which is designed to store data. Examples of optical media that are covered by this invention include digital tape, CDs, DVDs, discs, hard drives, etc. The optical media should be broadly understood to be any optical media where data can be read or written.

The software boundary can be any boundary limit, which may be imposed by software that runs or operates in conjunction with the operation of the recording instructions defined herein. In some cases, the software that imposes the limit is an operating system, and in other cases it can be software running on the same machine or another machine that is interconnected over a network. In either case, the boundary limit should be broadly understood to be any limit that may reduce the ability to record data to a media to the fullest extent or capacity of the media.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
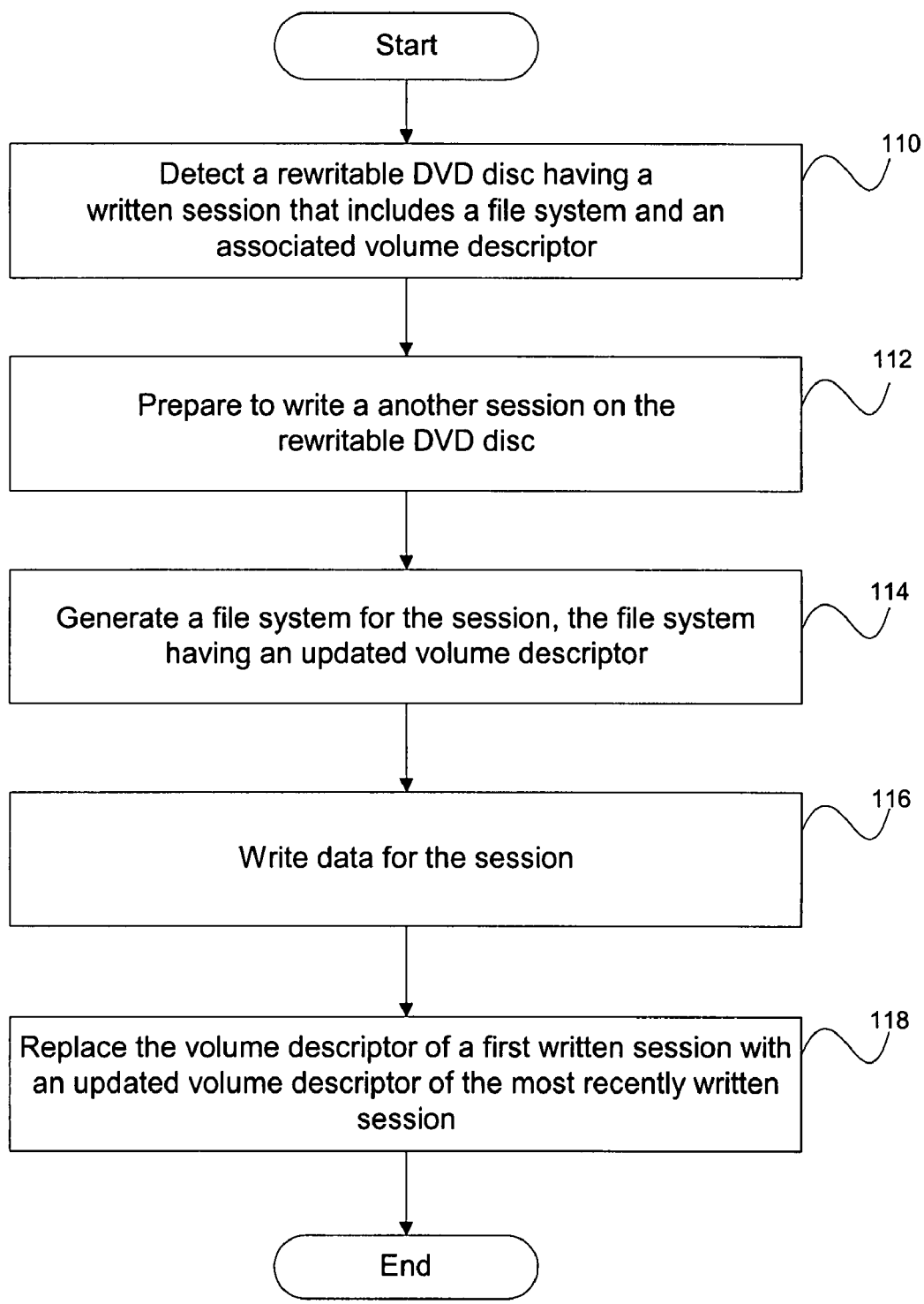
FIG. 1 shows a flow chart diagram illustrating the method of operations performed to a rewrittable DVD disc to enable the writing of new sessions and the subsequent updating of a first written session's volume descriptor with the new session's volume descriptor, in accordance with one embodiment of the invention.

FIG. 1 is a flow chart diagram 100 illustrating the method of operations performed on a rewritable DVD disc to enable the writing of new sessions and the subsequent updating of a first written session's volume descriptor with the new session's volume descriptor, in accordance with one embodiment of the invention. The method begins with operation 110, in which a rewritable DVD disc having previously written data that includes a file system and an associated volume descriptor is detected. For example, a user could insert a rewritable DVD disc into a drive coupled to a computing system. The computing system can be a desktop computer system, a portable computing device, etc. A software reader can then be used to access files on the DVD disc. The reader, in this embodiment, will refer to the file system stored on the DVD disc to access previously recorded file data.

Once the rewritable DVD disc containing a previously written session is detected by the DVD reader, the method advances to operation 112, in which preparation is made to write another or a new session to the rewritable DVD disc. For example, a user could be attempting to record a new file or files to the rewritable DVD disc, which has a previously recorded closed session or sessions. Assuming the preparation is made to write another session to the rewritable DVD disc, the method advances to operation 114.

In operation 114, a file system for the new session is generated and the file system for the new session contains an updated volume descriptor. After the file system for the new session is generated with an updated volume descriptor, the method advances to operation 116. In operation 116, data is written for the new session. Once the data for the new system has been written, the method advances to operation 118.

In operation 118 the volume descriptor of a first written session is replaced with an updated volume descriptor of the most recently written session. As is well know, the volume descriptor will function as a map to keep track of all new and previously recorded files, no matter in which session they were previously recorded. After the first written session has been modified, the method will be done.

Figure 2:
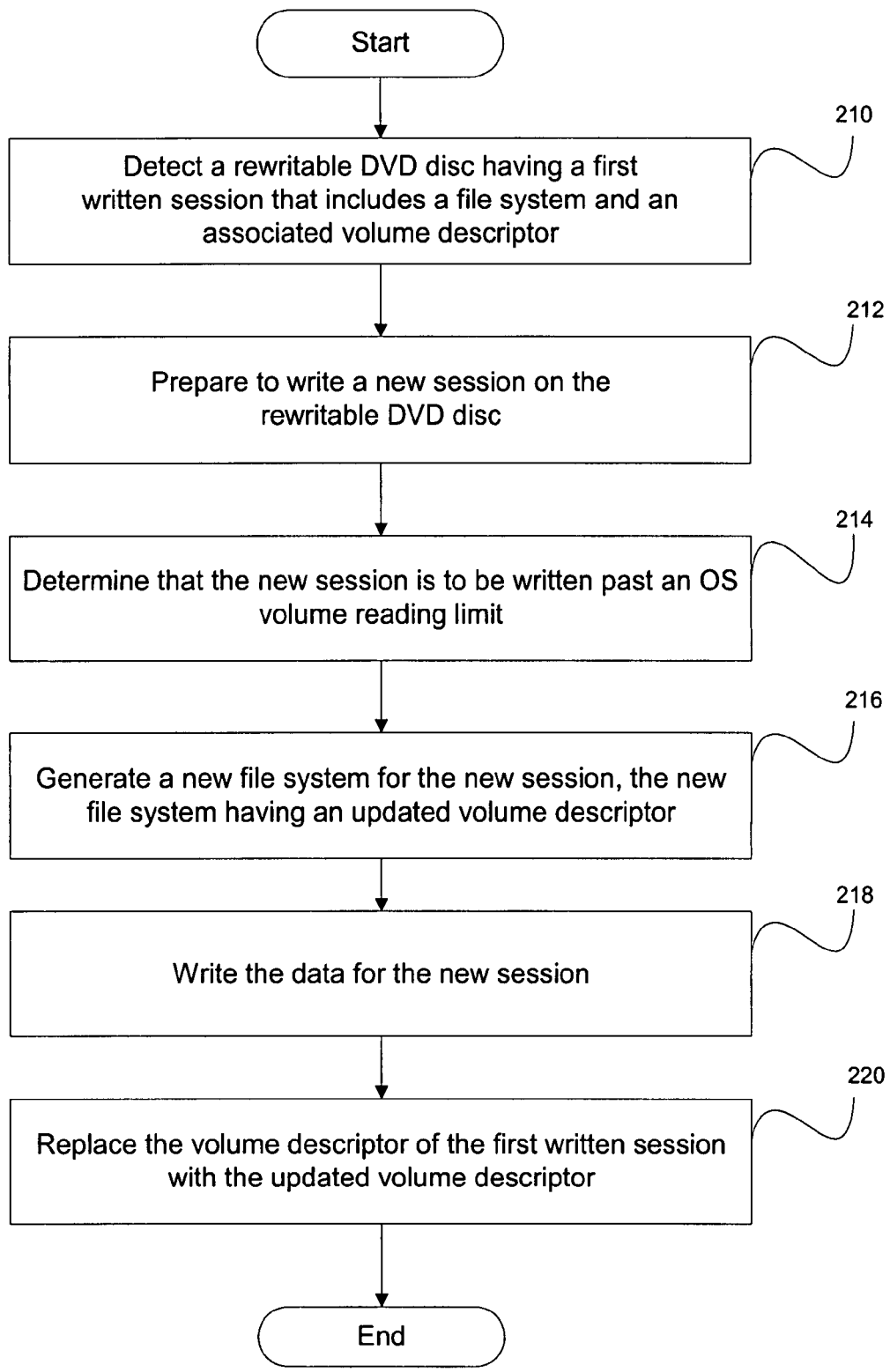
FIG. 2 shows a flow chart diagram illustrating the method of operations performed to a rewritable DVD disc for enabling the writing of a new session past an OS volume reading limit, in accordance with one embodiment of the invention.

FIG. 2 is a flow chart diagram 200 illustrating the method of operations performed to a rewritable DVD disc for enabling the writing of a new session past an OS volume reading limit, in accordance with another embodiment of the invention. The method begins with operation 210, in which a rewritable DVD disc having a first written session that includes a file system and an associated volume descriptor, is detected. For example, a user could insert a rewritable DVD disc into a drive coupled to a computing system. The computing system can be a desktop computer system, a portable computing device, etc. A software reader can then be used to access files on the DVD disc. The reader, in this embodiment, will refer to the file system stored on the DVD disc to access previously recorded data files.

Once the rewritable DVD disc having a first written session is detected, the method advances to operation 212, in which preparation is made to write a new session on the rewritable DVD disc. For example, a user could be attempting to record a new file or files to the rewritable DVD disc, which has a previously recorded closed session or sessions. Assuming the preparation is made to write a new session to the rewritable DVD disc, the method advances to operation 214.

In operation 214, a determination is made that the new session is to be written past an OS volume reading limit of the rewritable DVD disc. After the determination is made that the new session is to be written past the OS volume reading limit, the method advances to operation 216.

In operation 216, a new file system is generated for the new session, the new file system having an updated volume descriptor. Once the new file system is generated, the method advances to operation 218.

In operation 218 the volume descriptor of the first written session is replaced with the updated volume descriptor. As is well know, the volume descriptor will function as a map to keep track of all new and previously recorded files, no matter in which session they were previously recorded. After the first written session has been modified, the method will be done.

Figure 3:
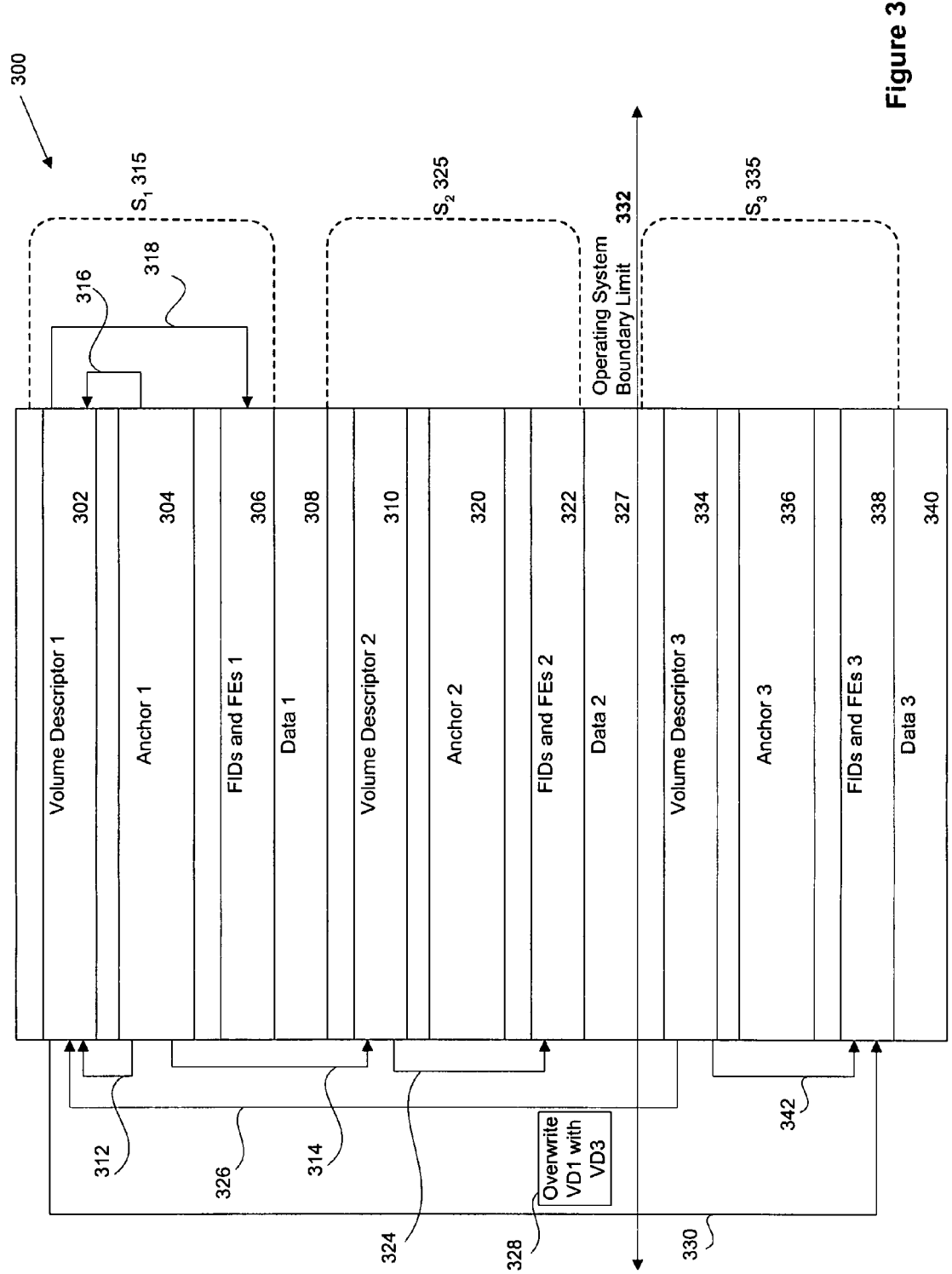
FIG. 3 shows a block diagram illustrating the general organization of data as recorded on the rewritable DVD disc in three sessions, with the third session being past the Operating System (OS) Boundary limit, in accordance with one embodiment of the invention.

FIG. 3 shows a block diagram 300 illustrating the general organization of data as recorded on a rewritable DVD disc in three sessions, with the third session being past the OS Boundary limit, in accordance with one embodiment of the invention. As represented in block diagram 300, the first two sessions $S_1$ 315 and $S_2$ 325 are separated from the third session $S_3$ 335 by an OS Boundary limit 332. The size of sessions, the size of a border 332, and the potential number of sessions recorded to the rewritable DVD disc are variable. The first session 315 contains an Anchor 1 304, a volume descriptor sequence—Volume Descriptor 1 302, a section of FIDs and FEs 1 306, and a Data 1 308 section. The FIDs are file identifiers and they are a fast way to represent all of your data files and they point to the FEs. The FEs are file entries and they are a more detailed description of the data files and they point to the data files. The components of the session can vary in size, location, and relative position. User data, such as written data files are contained in Data 1 308. The function of Anchor 1 is to initially point 312 to the beginning of the Volume Descriptor 1 302. An anchor is basically a type of pointer. Accordingly, "anchor" is only used herein as an example. It should therefore be understood that various specifications may well use other terminology for defining an anchor, pointer, or links that define the beginning of file system components. After the Anchor 1 points 312 to the beginning of the Volume Descriptor 1 302, then the Volume Descriptor 1 302 points to the FIDs and FEs 1 306. Next the FIDs and FEs 1 306 point to the first set of data files, Data 1 308.

In accordance with the claimed invention, after the first set of data, data 1 308 is done, the system moves to the second session $S_2$ 325. Anchor 1 304 now is set to point to the beginning of Volume Descriptor 2 310. Anchor 2 320 is not used. After Anchor 1 304 points to the beginning of the Volume Descriptor 2 310, then the Volume Descriptor 2 310 points 324 to the FIDs and FEs 2 322. The second set of FIDs and FEs 322 have the file descriptor and file entry information for both the first set of data, Data 1 308 and the second set of data, Data 2 327. Next the FIDs and FEs 2 322 point to the second set of data files, Data 2 327.

Continuing with the description of FIG. 3, after the second set of data, Data 2 327 is done, the system moves to the third session $S_3$ 335. Anchor 1 304 now is set to point to the beginning of the Volume Descriptor 3 334. Anchor 3 336 is not used. After the Anchor 1 304 points to the beginning of the Volume Descriptor 3 310, it is recognized that the operating system boundary limit 332 has been crossed. The Volume Descriptor 3 334 locates the FIDs and FEs 338, and records 342 its location. The third set of FIDs and FEs 3 338 have the file descriptor and file entry information for the first set of data, Data 1 308, the second set of data, Data 2 327, and the third set of data, Data 3 340. Next the FIDs and FEs 3 338 point to the third set of data files, Data 3 340. Since the operating system boundary limit 332 has been crossed and the process will be triggered to overwrite 326 Volume Descriptor 1 302 with Volume Descriptor 3 334. In the past, once the operating system boundary limit 332 had been crossed the disc would no longer mount and thus the contents past the operating system boundary limit 332 could not be located. With the new capability of triggering the updating of the volume descriptor after the operating system boundary limit 332 has been crossed, data files in sessions past the operating system boundary limit 332 can be located. Now the entire disc space can be used since the data files in new sessions past the operating system boundary limit 332 can be located with the updated volume descriptor of the first written session.

Figure 4:
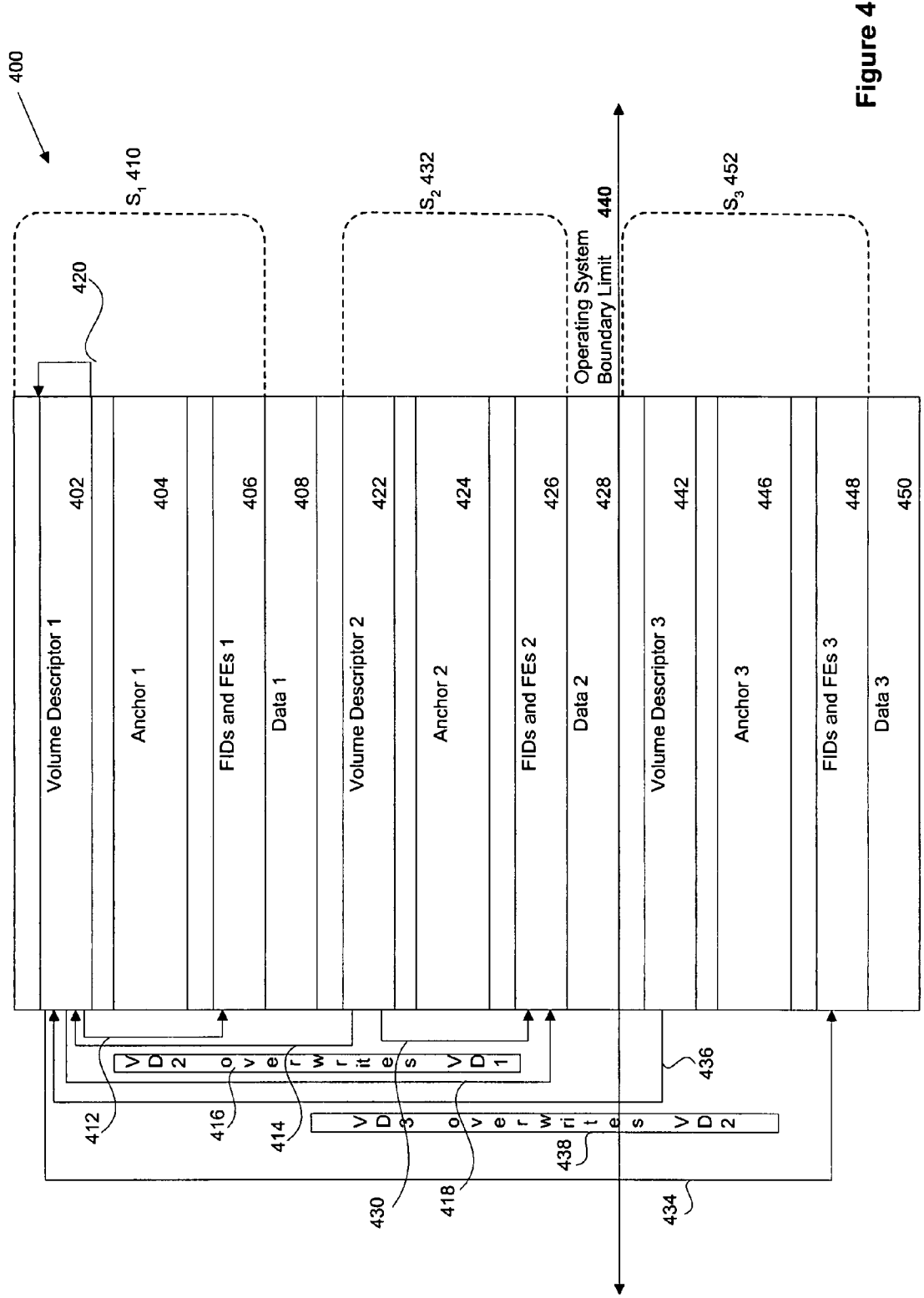
FIG. 4 shows a block diagram illustrating the general organization of data as recorded on a rewritable DVD disc in three sessions, with the third session being past the OS Boundary limit, in accordance with another embodiment of the invention.

FIG. 4 shows a block diagram 400 illustrating the general organization of data as recorded on a rewritable DVD disc in three sessions, with the third session being past the OS Boundary limit, in accordance with another embodiment of the invention. As represented in block diagram 400, the first two file systems $FS_1$ 410 and $FS_2$ 432 are separated from the third file system $FS_3$ 452 by an OS Boundary limit 440. The size of sessions, the size of file systems, the size of a boundary limit, and the potential number of sessions recorded to the rewritable DVD disc are variable. The first file system $FS_1$ 410 contains an Anchor 1 404, a Volume Descriptor 1 402, and a section of FIDs and FEs 1 406. The components of the file system can vary in size, location, and relative position.

User data, such as written data files are contained in the Data 1 408 section. Anchor 1 404 points 420 to the beginning of the Volume Descriptor 1 402. After the Anchor 1 404 points 420 to the beginning of the Volume Descriptor 1 402, then the Volume Descriptor 1 402 points to the FIDs and FEs 1 406. Next the FIDs and FEs 1 406 point to the first set of data files, Data 1 408.

In accordance with the claimed invention, after the first set of data, Data 1 408 is done, the system moves to the second file system $FS_2$ 432. Anchor 1 404 continues to point to the beginning of the Volume Descriptor 1 402. Anchor 2 424 is not used. Volume Descriptor 2 422 is overwritten 416 onto Volume Descriptor 1 402, information such as pointers to FIDs and FEs 2 426 is now in Volume Descriptor 1 402. After the Volume Descriptor 2 422 is overwritten 416 onto Volume Descriptor 1 402, and as Anchor 1 404 continues to point to the beginning of the overwritten Volume Descriptor 1 402, then the Volume Descriptor 1 402 points 418 to the FIDs and FEs 2 426. The set of FIDs and FEs 2 426 have the file descriptor and file entry information for both the first set of data, Data 1 408 and the second set of data, Data 2 428. The FIDs and FEs 2 426 point to the second set of data files, Data 2 428.

Continuing with the description of FIG. 4, after the second set of data, Data 2 428 is done, the system moves to the third file system $FS_3$ 452. Anchor 1 404 continues to point to the beginning of the Volume Descriptor 1 402. Anchor 3 446 is not used. Then the Volume Descriptor 3 402 points to FIDs and FEs 3 448. The set of FIDs and FEs 3 448 have the file descriptor and file entry information for the first, second, and third sets of data, Data 1 408, Data 2 428, and Data 3 450 respectively. Then the FIDs and FEs 3 448 point to the third set of data files, Data 3 450.

Next, Volume Descriptor 3 442 is overwritten 436 onto Volume Descriptor 1 402; information such as pointers to FIDs and FEs 448 is now in Volume Descriptor 1 402. After the Volume Descriptor 3 442 is overwritten 436 onto Volume Descriptor 1 402 and as Anchor 1 404 continues to point to the beginning of the overwritten Volume Descriptor 1 402, then the Volume Descriptor 1 402 points 434 to the FIDs and FEs 3 448.

Even though the operating system boundary limit 440 has been crossed the process will not stall, since the Volume Descriptor 1 402 is overwritten with the Volume Descriptor of the current file system. In the past, once the operating system boundary limit 440 had been crossed the disc would no longer mount and thus the contents past the operating system boundary limit 440 could not be located. One advantage of the new feature of updating the volume descriptor after each file system is entered, is that data files in sessions past the operating system boundary limit 440 can be located. Now the entire disc space can be used since the data files in new sessions past the operating system boundary limit 440 can be located with the updated volume descriptor of the first written session.

As described above, it is believed that the rewritable DVD disc can be utilized past an Operating System boundary limit by maintaining and referencing the latest information of a current file system's volume descriptor at a location before the Operating System boundary limit. As a result, sessions can be saved and retrieved past an Operating System boundary limit on a rewritable DVD disc.

Each of the methods described above enable the recording of sessions past an Operating System boundary limit of a rewritable DVD disc, and allow the subsequent reading of data stored in all recorded sessions, and further allow the user to save and fully access sessions past an Operating System boundary limit on a recorded rewritable DVD disc. This enables the full utilization of the disc's entire storage space. Since one of the advantages of the rewritable DVD disc technology is its large capacity for data storage, it is essential to be able to fully utilize this capacity.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, FLASH, EEPROMs, CD-ROMs, CD-Rs, CD-RWs, DVDs, magnetic tapes, and other optical data storage devices. The computer readable medium is available to network coupled computer systems so that the computer readable code within the computer readable medium may be stored and executed in a distributed fashion.

The invention has been described herein in terms of several exemplary embodiments. Other embodiments of the invention will be apparent to those skilled in the art from consideration of the specification and practice of the invention. For instance, other recording standards, such as for example, ISO 9660, Joliet, HFS for Macintosh, etc., may benefit from the teachings defined herein. Therefore, the embodiments and preferred features described above should be considered exemplary, with the invention being defined by the appended claims and equivalents thereof.

What is claimed is:

1. A software driven method for appending data to a rewritable DVD disc, the method comprising:

detecting a rewritable DVD disc, wherein the rewritable DVD disc contains a first written session with a file system and an associated volume descriptor;

detecting a request to write a new session to the rewritable DVD disc;

determining that the new session is to be written past an Operating System boundary limit of the rewritable DVD disc;

generating a new file system for the new session, the new file system having an updated volume descriptor;

writing data for the new session; and replacing the volume descriptor of the first written session with the updated volume descriptor, the volume descriptor of the first written session located before the Operating System boundary limit.

2. The software driven method as recited in claim 1, further comprising:

setting an anchor to point to the volume descriptor of the first written session.

3. The software driven method as recited in claim 1, wherein the sessions are of an optical disc format.

4. The software driven method as recited in claim 1, wherein the sessions are of an Universal Disc Format.

5. A software driven method for appending data to a rewritable DVD disc, the method comprising:

receiving a rewritable DVD disc for recording, wherein the rewritable DVD disc contains a previously written session with a file system and an associated volume descriptor;

detecting a request to append a new session to the rewritable DVD disc;

generating a file system for the new session, the file system having an updated volume descriptor;

writing data for the new session, wherein the new session is located after an operating system boundary limit and the previously written session is located before the operating system boundary limit; and replacing the volume descriptor of a first written session with an updated volume descriptor of the new session, the volume descriptor of the first written session located before the operating system boundary limit.

6. The software driven method driven method as recited in claim 5, further comprising:

setting an anchor to point to the volume descriptor of the first written session.

7. The software driven method as recited in claim 5, wherein the sessions are of an optical disc format.

8. The software driven method as recited in claim 5, wherein the sessions are of an Universal Disc Format.

9. A computer driven method for recording data to an optical disc, comprising:

detecting an optical disc, wherein the optical disc contains a first written session with a file system and an associated volume descriptor;

detecting a request to write a new session to the optical disc;

determining that the new session is to be written past an Operating System volume reading limit of the rewritable DVD disc;

generating a new file system for the new session, the new file system having an updated volume descriptor;

writing data for the new session; and replacing the volume descriptor of the first written session with the updated volume descriptor, the volume descriptor of the first written session located before the Operating System boundary limit.

10. The computer driven method as recited in claim 9, further comprising:

setting a pointer to point to the volume descriptor of the first written session.

11. The computer driven method as recited in claim 9, wherein the sessions are of a Universal Disc Format.

12. The computer driven method as recited in claim 9, wherein the optical disc is a rewritable DVD disc.

13. The computer driven method as recited in claim 10, wherein the pointer is an anchor.

14. Computer readable media having program instructions embedded on a data storage device which when read by a computer system causes the computer system to perform a method for appending data to an optical disc, the method comprising:

detecting an optical disc, wherein the optical disc contains a first written session with a file system and an associated volume descriptor;

detecting a request to write a new session to the optical disc;

determining that the new session is to be written past a boundary limit of the optical disc;

generating a new file system for the new session, the new file system having an updated volume descriptor;

writing data for the new session; and replacing the volume descriptor of the first written session with the updated volume descriptor, volume descriptor of the first written session located before the boundary limit of the optical disc.

15. The computer readable media as recited in claim 14, further comprising:

setting an anchor to point to the volume descriptor of the first written session.

16. The computer readable media as recited in claim 14, wherein the sessions are of an optical disc format.

17. The computer readable media as recited in claim 14, wherein the optical disc format is of a Universal Disc Format.

18. A software driven method for recording data to an optical media, the method comprising:

detecting an optical media, wherein the optical media contains a first written session with a file system and an associated volume descriptor;

detecting a request to write a new session to the optical media;

determining that the new session is to be written past a software boundary limit of the optical media;

generating a new file system for the new session, the new file system having an updated volume descriptor;

writing data for the new session to the optical media; and replacing the volume descriptor of the first written session with the updated volume descriptor, the volume descriptor of the first written session located before the software boundary limit of the optical media.

\* \* \* \* \*